US008010576B2

(12) United States Patent
Nilva (10) Patent No.: US 8,010,576 B2
(45) Date of Patent: Aug. 30, 2011

(54) INVENTORY AND CONFIGURATION MANAGEMENT

(75) Inventor: Leonid Nilva, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 11/121,859

(22) Filed: May 3, 2005

(65) Prior Publication Data

US 2006/0041567 A1    Feb. 23, 2006

Related U.S. Application Data

(60) Provisional application No. 60/603,465, filed on Aug. 19, 2004.

(51) Int. Cl.
G06F 7/00 (2006.01)
G06F 9/44 (2006.01)

(52) U.S. Cl. ......................................... 707/804; 717/169

(58) Field of Classification Search .................. 707/1, 4, 707/10, 104, 103 R; 715/513; 717/107, 717/108, 126, 136, 143, 176; 709/201, 203, 709/206, 219, 225, 228, 229, 231, 236
See application file for complete search history.

(56) References Cited

U.S. PATENT DOCUMENTS

| | | | |
|---|---|---|---|
| 5,499,371 A * | 3/1996 | Henninger et al. ............ 717/108 |
| 5,692,129 A * | 11/1997 | Sonderegger et al. ..... 707/103 R |
| 5,715,373 A * | 2/1998 | Desgrousilliers et al. ...... 706/47 |
| 5,717,911 A * | 2/1998 | Madrid et al. ...................... 707/2 |
| 5,734,907 A * | 3/1998 | Jarossay et al. ................ 717/141 |
| 5,859,978 A * | 1/1999 | Sonderegger et al. ......... 709/226 |
| 5,926,810 A * | 7/1999 | Noble et al. ........................ 707/4 |
| 6,122,639 A * | 9/2000 | Babu et al. ................. 707/103 R |
| 6,173,289 B1 * | 1/2001 | Sonderegger et al. ..... 707/103 R |
| 6,226,788 B1 * | 5/2001 | Schoening et al. ............ 717/107 |
| 6,226,792 B1 * | 5/2001 | Goiffon et al. ................. 717/120 |
| 6,427,230 B1 * | 7/2002 | Goiffon et al. ................. 717/108 |
| 6,633,878 B1 * | 10/2003 | Underwood ................... 707/100 |
| 6,856,985 B1 * | 2/2005 | Pierce et al. ....................... 707/1 |
| 7,185,075 B1 * | 2/2007 | Mishra et al. .................. 709/223 |
| 7,418,700 B2 * | 8/2008 | Zimniewicz et al. .......... 717/175 |
| 2002/0029256 A1 * | 3/2002 | Zintel et al. .................... 709/218 |
| 2002/0035621 A1 * | 3/2002 | Zintel et al. .................... 709/220 |
| 2002/0042687 A1 * | 4/2002 | Tracy et al. .................... 702/119 |
| 2003/0172368 A1 * | 9/2003 | Alumbaugh et al. .......... 717/106 |
| 2003/0195957 A1 * | 10/2003 | Banginwar .................... 709/223 |

(Continued)

OTHER PUBLICATIONS

"What's New in Microsoft Systems Management Server 2.0" Feb. 8, 1999.    <http://web.archive.org/web/20010416003324/www.microsoft.com/smsmgmt/exec/whatsnew.asp>.*

(Continued)

*Primary Examiner* — Pierre M Vital
*Assistant Examiner* — Christopher P Nofal
(74) *Attorney, Agent, or Firm* — Kilpatrick Townsend & Stockton LLP (57) ABSTRACT

A schema is provided that describes specific executables and parameters. Relationships between the executables and parameters are also defined. The schema is provided to represent SCM and IM tasks uniformly. Information regarding a specific component is represented by the schema. The schema may then be used to describe metadata for specific components. For example, the schema provides information for components such as how the component is comprised (its parts), its relationship to other components (i.e., dependencies), its parameters, the parameters' constraints and dependencies, etc. This provides a universal framework that is independent of specific component and can be used for SCM as well as for IM.

21 Claims, 7 Drawing Sheets

U.S. PATENT DOCUMENTS

| | | | |
|---|---|---|---|
| 2004/0019664 A1* | 1/2004 | Le et al. | 709/220 |
| 2004/0054933 A1* | 3/2004 | Wong et al. | 713/202 |
| 2004/0093593 A1* | 5/2004 | Jhanwar et al. | 717/169 |
| 2004/0107183 A1* | 6/2004 | Mangan | 707/2 |
| 2004/0163041 A1* | 8/2004 | Engel | 715/509 |
| 2004/0210607 A1* | 10/2004 | Manchanda et al. | 707/203 |
| 2004/0260800 A1* | 12/2004 | Gu et al. | 709/223 |
| 2006/0010232 A1* | 1/2006 | Page et al. | 709/223 |
| 2006/0200494 A1* | 9/2006 | Sparks | 707/104.1 |
| 2006/0259634 A1* | 11/2006 | Hood et al. | 709/230 |
| 2006/0277249 A1* | 12/2006 | Yassin et al. | 709/203 |

OTHER PUBLICATIONS

"SMS 2.0 SDK Documentation" Feb. 1999. <http://msdn2.microsoft.com/en-us/library/ms815308.aspx>.*

"XML" Feb. 20, 2006, p. 1-3. <http://web.archive.org/web/20060220210330/http://en.wikipedia.org/wiki/Xml>.*

* cited by examiner

INVENTORY AND CONFIGURATION MANAGEMENT

CROSS-REFERENCES TO RELATED APPLICATIONS

This application claims priority from co-pending U.S. Provisional Patent Application No. 60/603,465 filed Aug. 19, 2004 entitled INVENTORY AND CONFIGURATION MANAGEMENT which is hereby incorporated by reference, as if set forth in full in this document, for all purposes.

BACKGROUND OF THE INVENTION

The present invention generally relates to inventory control and configuration management and more specifically to techniques for using a schema to describe metadata for inventory control and software configuration management tasks.

Software configuration management (SCM) is traditionally understood as an activity that relates to provisioning software components (i.e., programs, applications) onto appropriate operational environments (such as a particular operating system situated on a particular hardware component) and to setting attributes (e.g., parameters) to ensure proper functioning of the software components in the environments. There are many different ways to express attributes for provisioning various software components and to specify how to set the attributes. Each product may express its own attributes differently, which causes great difficulties in uniformly addressing software configuration management for combinations of products.

Inventory management (IM) is traditionally understood as maintaining a life cycle of components, which includes such tasks as knowing what is available for provisioning, what is being provisioned, and where it is provisioned. In addition to component life cycle management, IM also includes the maintenance of hardware, for example which hardware items (network cards, hard drives, CPUs, memory, etc.) are available, how they are assembled into blocks or blades, how they are connected network-wise, etc. IM typically includes its own way of expressing attributes for the provisioned software/hardware.

Accordingly, software configuration management and IM tasks do not deal with common metadata. For example, different products use different metadata for performing software configuration management and inventory management tasks. Accordingly, it is difficult to address SCM and IM tasks despite the fact that they have overlapping domains.

BRIEF SUMMARY OF THE INVENTION

The present invention generally relates to providing a unified method of describing metadata for software configuration management (SCM) and inventory management (IM) tasks. A schema is provided that describes a way to describe specific executables and parameters. Relationships between the executables and parameters are also defined. The schema is provided to represent SCM and IM tasks uniformly. Information regarding a specific component is represented by the schema. The schema may then be used to describe metadata for specific components. For example, the schema provides information for components such as how the component is comprised (its parts), its relationship to other components (i.e., dependencies), its parameters, the parameters' constraints and dependencies, etc. This provides a universal framework that is independent of specific components and can be used for SCM as well as for IM.

In one embodiment, a schema for a model of metadata for inventory control and configuration management is provided. The schema comprises: a description describing an inventory control and configuration management task for a component, wherein the description includes an executable and one or more parameters for the executable, wherein the component models a functionality of the executable, wherein an instance is created using the description, wherein the instance in includes one or more values for parameters in the one or more parameters of the description, wherein the description models metadata for the functionality of the component.

In another embodiment, a method for inventory control and configuration management using a schema is provided. The method comprises: providing a description schema configured to be used to describe inventory control and configuration management tasks, the schema modeling metadata for a plurality of components, wherein metadata for a first component is different from metadata for a second component; receiving a description describing an inventory control and configuration management task; and performing the task using the description, wherein the description allows the task to be performed with metadata for models of components.

In yet another embodiment, a method for providing inventory control and configuration management is provided. The method comprises: receiving a description describing an executable and one or more parameters for the executable, the executable describing an inventory control and configuration management task for a component and the one or more parameters being parameters needed to perform the task; determining one or more values for the one or more parameters; and performing the task for the executable using the one or more parameters.

A further understanding of the nature and the advantages of the inventions disclosed herein may be realized by reference of the remaining portions of the specification and the attached drawings.

DETAILED DESCRIPTION OF THE INVENTION

Figure 1:
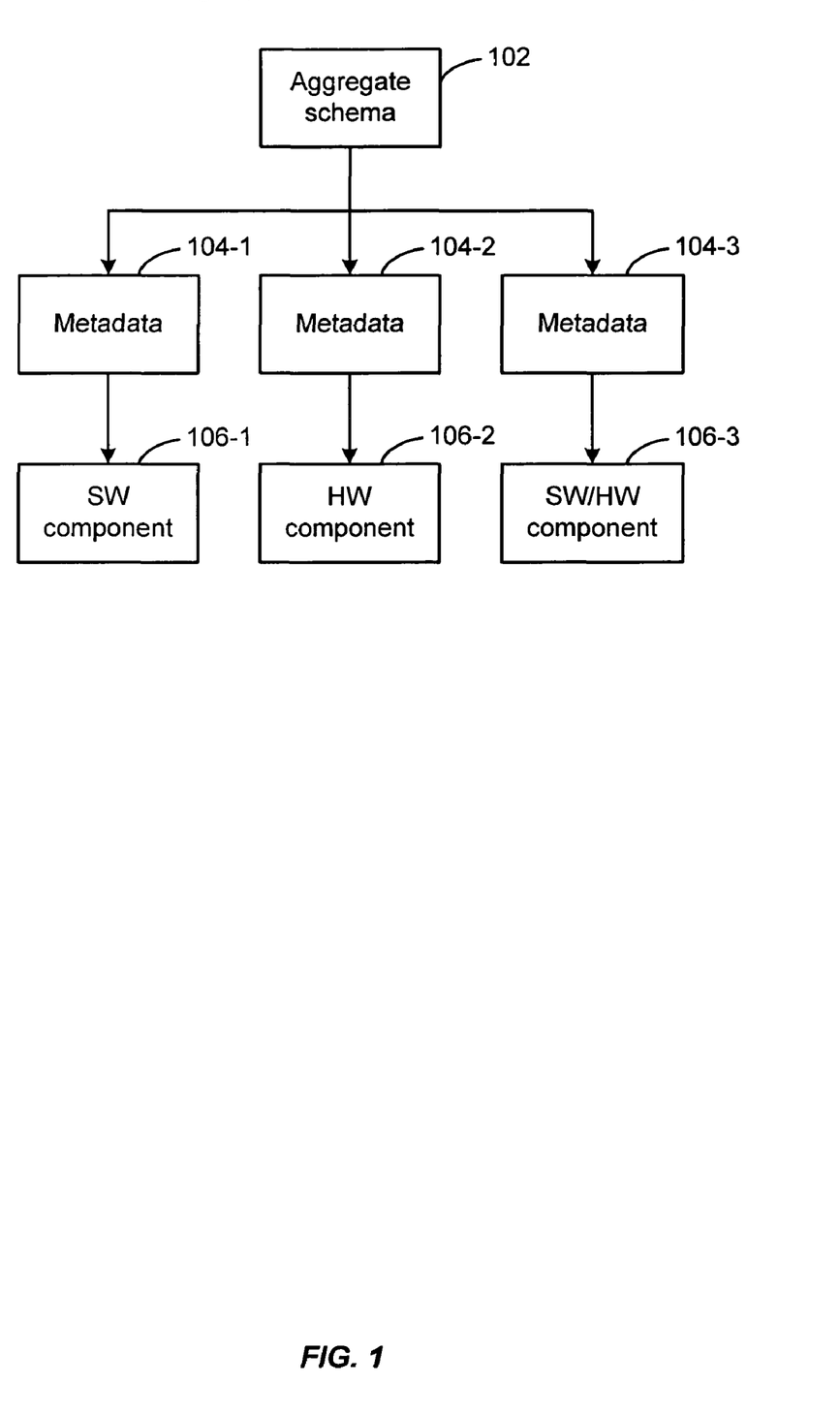
FIG. 1 depicts a relationship between software and hardware components, their metadata, and an aggregate schema according to one embodiment of the present invention.

FIG. 1 depicts a relationship between software and hardware components, their metadata, and an aggregate schema according to one embodiment of the present invention. As shown, an aggregate schema 102, metadata 104, and components 106 are provided.

Components 106 may be a software component, hardware component, or a combination of a software/hardware component. Software components may be any software, such as programs, applications, etc. Hardware components may be any hardware, such as computers, storage devices, etc. The combination of a software/hardware component may be a software application that is installed on a computer.

Each component 106 may be a certain product. In order for the product to be used, tasks are performed. For example, software configuration management (SCM) and inventory management (IM) tasks are performed using a component 106. For example, a software component 106-1 may be provisioned on a hardware component 106-2. After provisioning, other tasks may be performed such as the maintenance of hardware, maintenance of software, etc. In order to perform these tasks, certain information is needed, such as how to set certain parameters to ensure the proper functioning of components 106. The parameters provide what is needed in order to perform the SCM or IM task.

The parameters and actions that need to be performed using the parameters may be expressed in metadata 104. In one embodiment, each component 106 includes its own metadata 104. This metadata may be different among different components.

Metadata 104 describes how a component 106 is specifically configured for a particular task. Conventionally, various metadata 104 was not compatible and uniform. Thus, it was difficult to perform tasks using different components 106.

Aggregate schema 102 provides a schema that is used to describe metadata 104 for all components 106. In one embodiment, schema 102 is an XML (extensible markup language) schema. Schema 102 provides a uniform way of expressing tasks for metadata 104. For example, aggregate schema 102 allows the definition of information regarding a specific component, such as how it is comprised (its parts), its relationship to other components (i.e., dependencies), its parameters, the parameters' constraints and dependencies, etc. Thus, the possible actions and parameters for a component 106 are provided in a uniform manner that can be used with metadata 104 for other components 106. Thus, if a task for software component 106-1 involves a hardware component 106-2, an aggregate schema 102 may be used to express the task and parameters needed. The aggregate schema 102 may thus be considered metadata for metadata 104.

Figure 2:
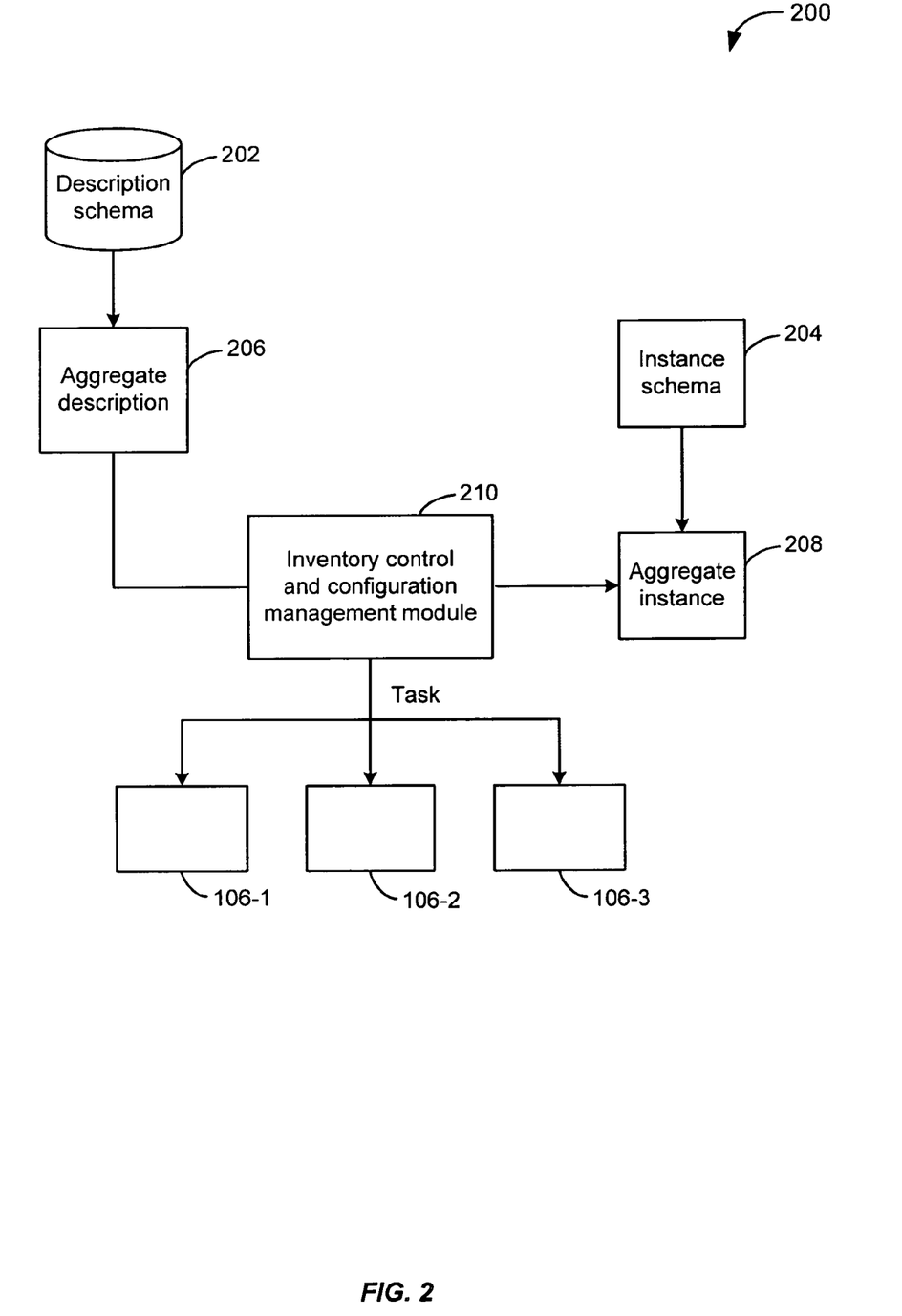
FIG. 2 depicts a system that uses aggregate schema according to one embodiment of the present invention.

FIG. 2 depicts a system 200 that uses aggregate schema 102 according to one embodiment of the present invention. Aggregate schema 102 may be broken into a description schema 202 and an instance schema 204. Description schema 202 is governs aggregate descriptions 206. Description schema 202 describes a form that can be used to describe all descriptions 206.

An aggregate description 206 describes executables and parameters for a component 106. The description is generated based on description schema 202. Aggregate descriptions 206 include textual descriptions of an executable and its parameters 304.

An executable may be considered a self-sufficient program that can be executed. For example, an executable, when run, performs an action. Executables are represented as aggregate descriptions 206 that define their parameters, actions, and operations. Executables may be understood to be runnable software components, which can be provisioned, configured, reconfigured, patched, upgraded, etc.

An executable may include bits, actions, operations, and compositions. Bits relate to pieces of code in associated files that may be needed for filling the functionality of the executable. Parameters may describe where the bits come from (some code or process), actions may describe how the bits are combined (on the fly summary of executables, i.e., linking), the platform, version, and patch level, and other features.

Executables may include actions, which may include instructions on how to install, de-install, configure, and do other things with the executable. If the functionality of the executable exists in a variety of phases, actions can carry the functionality of executable 302 from one phase to another.

Executables may also include operations, which include instructions on how to create and/or modify the composition of the functionality of executable 302. For example, an operation may describe how to add a node to a cluster.

The parameters may be any parameters that are needed to be set in order for the executable to run. The parameters 304 in a description 206 do not include values assigned to them. These values are contained in an aggregate instance 208. For example, parameters may be configuration parameters. The parameters may include attributes, plug-ins, and actions. An attribute may be a parameter that is associated with a component 106. Plug-ins may be a plug-in that is needed for component 106. Actions may be an executable is something that could be done with that executable to control it and/or to modify its behavior. For example, an action may be "perform patch", "do upgrade", "start me", "stop me", "clone me".

A parameter may be represented by a triplet <name, data type, datum>. With respect to an aggregate description 206, a parameter may be represented as <name, data type> and an aggregate instance 208 as <name, datum>. The name is the same for both a description 206 and an instance 208, but the data type is provided in the description 206 and the actual value is provided in the instance 208.

Different types of parameters may be provided. For example, simplest, simple and array parameters may be provided. Other types of parameters will also be appreciated by a person skilled in the art.

A simplest parameter may be a parameter with a data type that is one of a certain number of basic types (string, numeric, Boolean, etc.), and pre-defined data types, such as a file or a custom type such as a Java class name.

A simple parameter may be a parameter which includes a data type that is an ordered list of a number of named simplest parameters. For example, a simple parameter may include a sequence of a number of simplest parameters of different data types.

An array parameter may be a parameter that includes a plurality of the same simplest parameters. All members of the plurality of simplest parameters have the same data types.

A user can decide to perform a task using an inventory control and configuration management module 210. When performing the task, values for the parameters may be determined for an aggregate description 206. These values may be represented in an aggregate instance 208.

An aggregate instance 208 provides the state of the executable. For example, the aggregate instance 208 provides the values for the parameters in addition to the result of the executable action when it is performed. Accordingly, when an executable action is performed, the result of the action may be stored in aggregate instance 208. Additionally, other information may be stored in aggregate instance 208, such as a time stamp. The time stamp may include a time in which the aggregate description 206 was processed to modify its parameters or to perform its actions.

The form of aggregate instance 208 may be governed by an instance schema 204. The instance schema 204 describes a form that can be used to describe all instances 208 for various components 106.

When ICCM 210 receives an aggregate description 206 for a task, parameter values for the task are determined. The parameter values are then used to perform the action on a component 106. The parameters and action describe the task that is needed and allow the task to be performed on component 106. For example, a server functionality may be provided for a hardware component 106 using an aggregate description 206 for a server executable.

Figure 3:
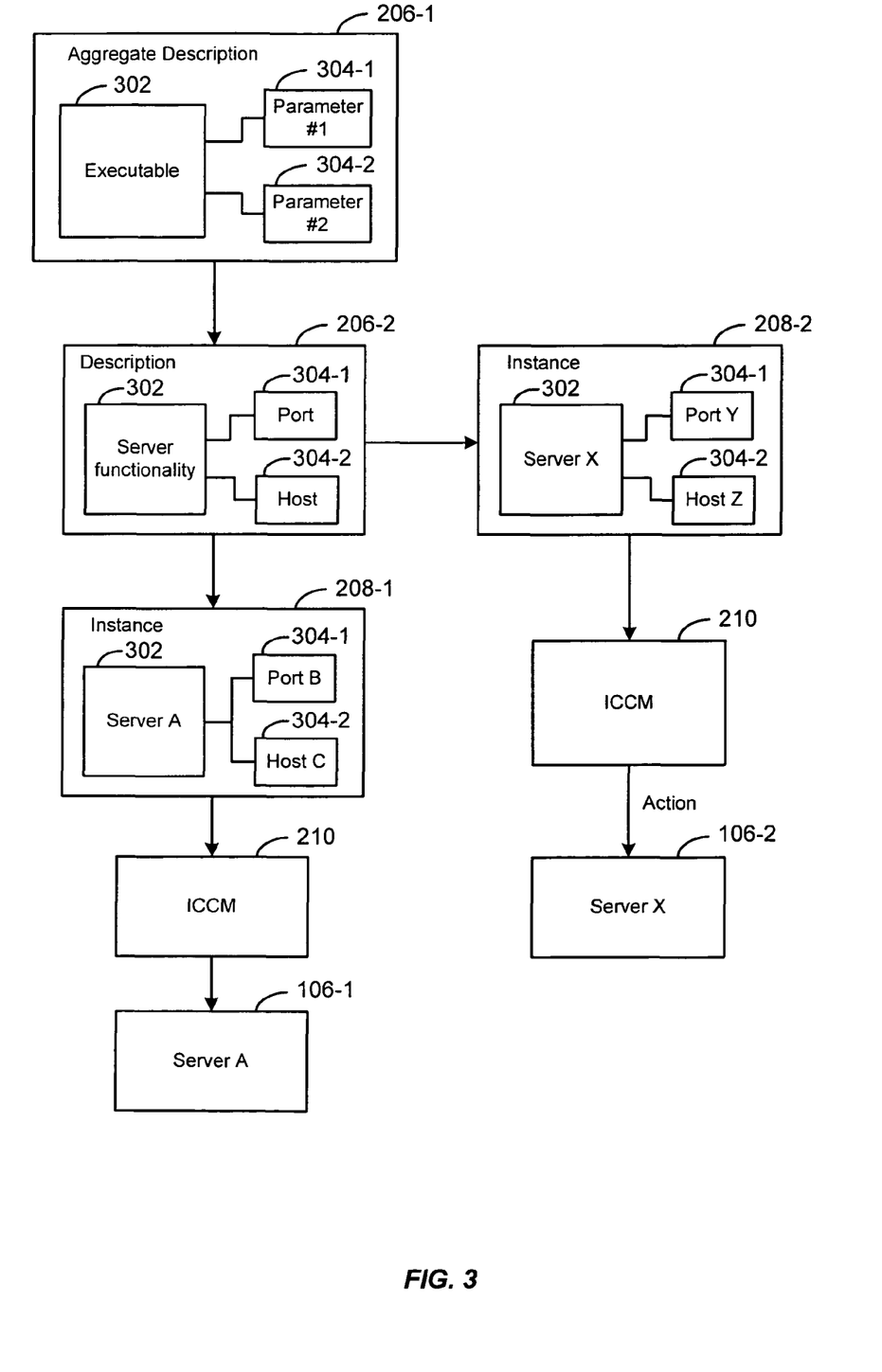
FIG. 3 shows an example of an aggregate description and aggregate instances according to one embodiment of the present invention.

FIG. 3 shows an example of an aggregate description 206 and aggregate instances 208-1 and 208-2 according to one embodiment of the present invention. As shown, an aggregate description 206-1 includes an executable 302 and a first parameter 304-1 and a second parameter 304-2. Executable 302 may have an action that should be performed by ICCM 210. The action may correspond to a SCM or IM task. For example, the executable, when running, may provide a server functionality of a server component 106.

Parameters 304 describe parameters that are needed in order execute a function, i.e., to do what it is designed to do. For example, parameter 304-1 may be a port name and parameter 304-2 may be a host name. The port name and host name may be required to provide the server functionality for a component 106 for the port and host. The executable 302 and parameter 304 are shown in description 206-2.

Various tasks may be performed with a component 106 using description 206. The executable delivering the server functionality for description 206 may be implemented on a component 106. As shown in aggregate instance 208-1, the functionality for a server A is enabled when the parameters port B and host C are provided. The executable is run using the parameters port B and host C by ICCM 210 in order to perform a task on a component 106. By performing the task, component 106 may be provisioned as a server A with the host enabled system as host C and an available port of a system as port B.

Additionally, description 206 may be used to perform a task for another component 106-2. As shown in instance 208-2, the functionality of a server X with parameters 304 of a port Y and a host Z are provided. ICCM 210 then performs the executable on component 106-2 in order to provide the functionality of a server X with a host name of Z and an available port of Y. Thus, the same aggregate description 206 may be used to provision a component 106 in different ways.

In one example, the executable may cause a software component 106 that is installed on a hardware device to function as a server, if the host name of the server on which the software component 106 is installed is equal to the host name of the server and the port is assigned to an available port of the server.

Figure 4:
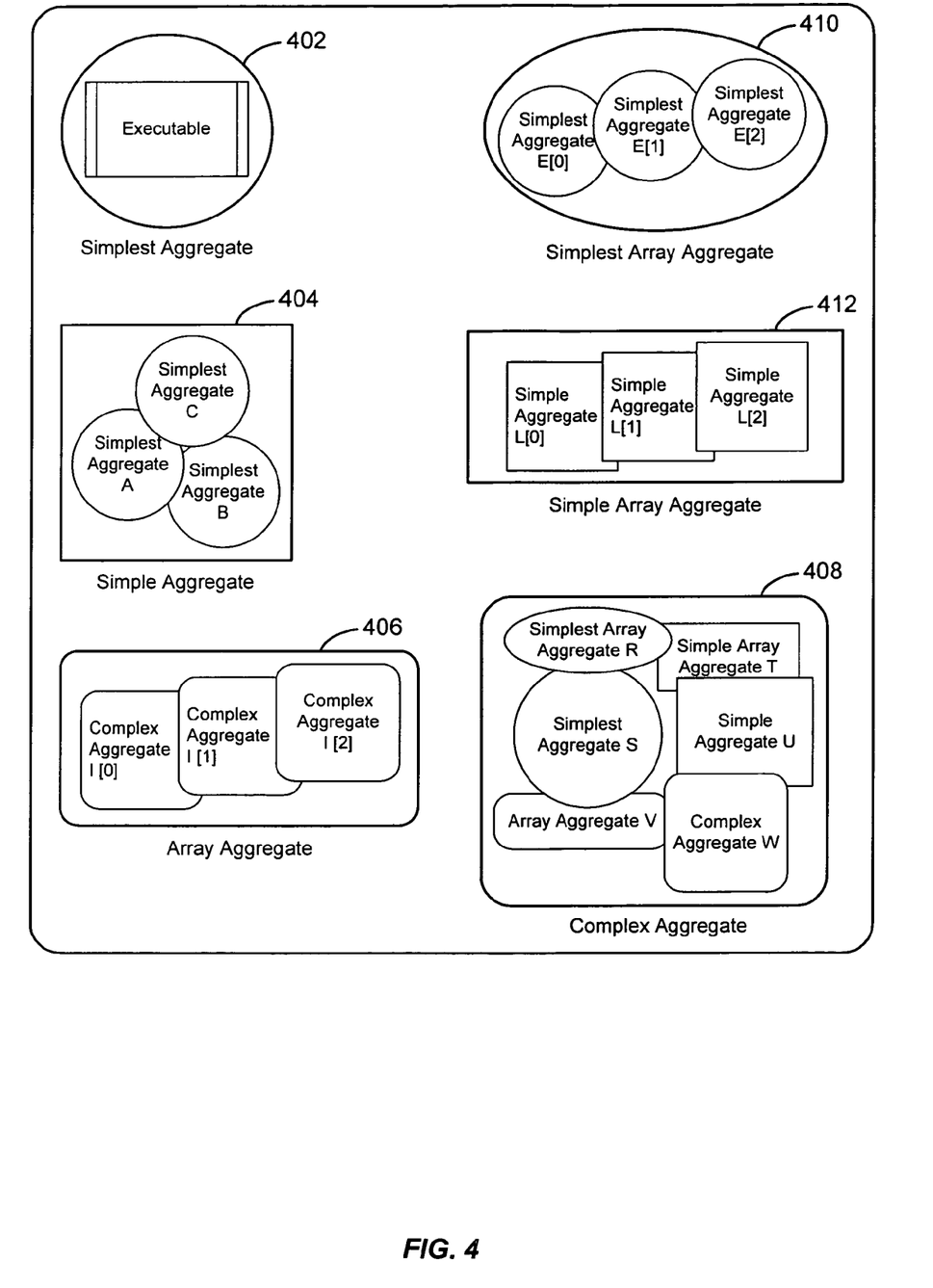
FIG. 4 depicts different types of aggregates are shown according to one embodiment of the present invention.

The aggregate 206 described in FIG. 3 may be referred as a simplest aggregate. A simplest aggregate includes one executable 302 and any number of parameters 304. It should be understood that other aggregates may be contemplated. For example, as shown in FIG. 4, different types of aggregates are shown according to one embodiment of the present invention.

As shown, a simplest aggregate 206-1 is provided. A simplest aggregate includes one executable in any number of parameters 304 (not shown). A simplest aggregate may be combined with other simplest aggregates to form a simple aggregate 404. An array aggregate may include a number of aggregates that are the same aggregates. For example, a simplest aggregate may form a simplest array aggregate where a simplest array aggregate 410 includes a plurality of the same simplest aggregates 402. Also, a simple array aggregate 412 includes a plurality of simple aggregates 404 that are the same. A complex aggregate 408 may include an aggregate that includes different aggregates of different types. Accordingly, aggregates may be combined in order to form various types of aggregates.

The above aggregates may be used to reflect ways components are composed of other components. For instance, a client-server component including a server component and a client component may be represented by a simple aggregate that includes two simple aggregates. Another example is a notion of a cluster (a plurality of the same components), which may be represented by a simple array aggregates including a number of simple components of the same type.

Figure 5:
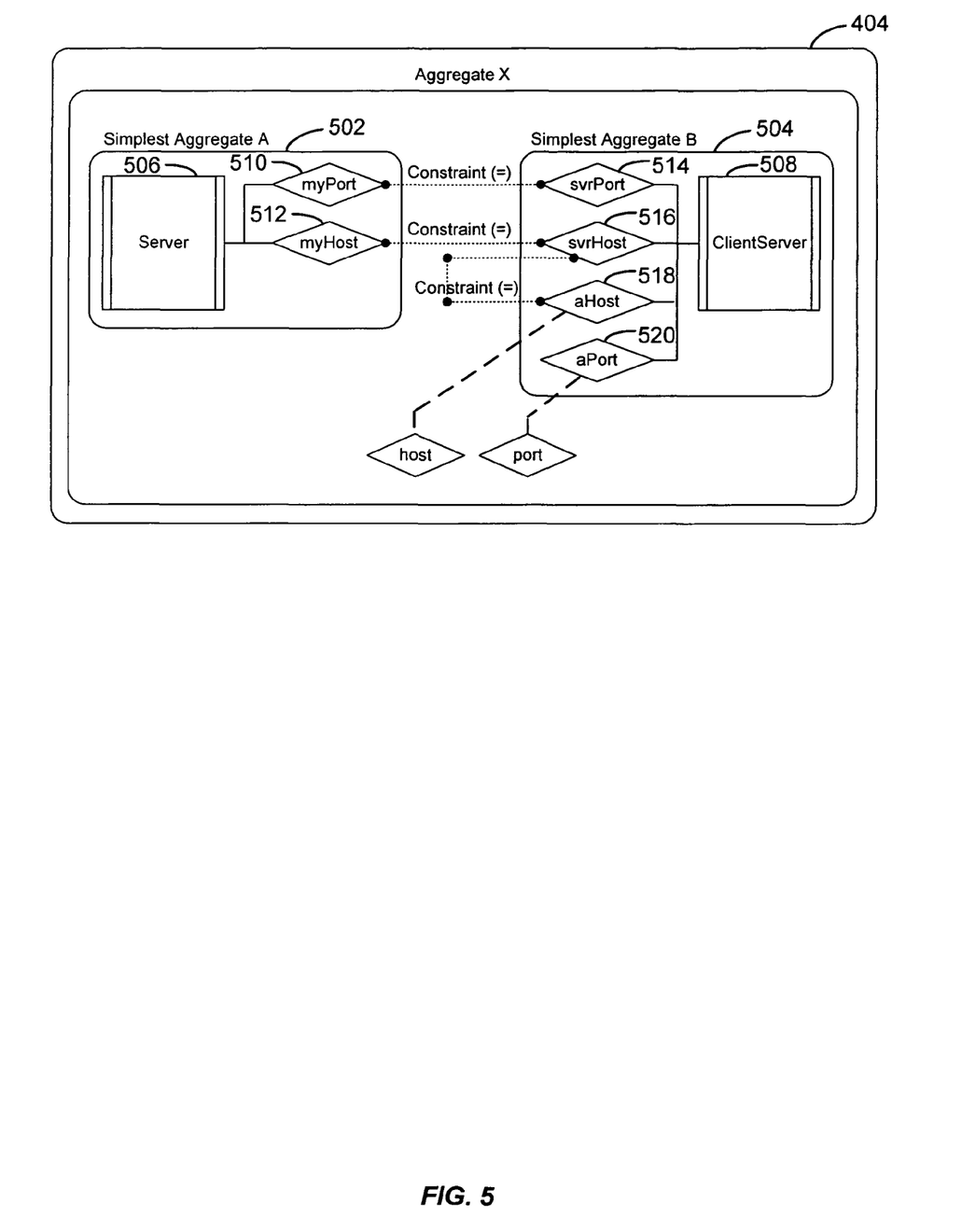
FIG. 5 depicts a simple aggregate and its parameters according to one embodiment of the present invention.

FIG. 5 depicts a simple aggregate and its parameters according to one embodiment of the present invention. As shown, a simplest aggregate A 502 and a simplest aggregate B 504 are provided in simple aggregate 404. Simple aggregate 404 may provide a server and a client/server functionality if the parameters are configured according to certain constraints.

Constraints are placed on certain parameters such that if they are met, the executables associated with the parameters can deliver its functionality, that is, the server component to act as a server, provided that host and port parameters are set to specific values. As shown in FIG. 5, a server functionality 506 and a client/server functionality 508 are provided. A parameter 510 and a parameter 512 are provided for simplest aggregate A 502 and parameters 514, 516, 518, and 520 are provided for simplest aggregate B 504.

The server and client/server functionality can be implemented if the constraints for the parameters are met. For example, myHost parameter 512 is constrained with svrHost parameter 516. This constraint may be that a server functionality host component for simplest aggregate A 502 should be set to the same client/server host on the same system as the system for simplest aggregate B 504. Also, myHost parameter 512 should be equal to the aHost parameter 518. This constraint may be that the host name of the system should be equal to the myHost parameter 512 and the aHost parameter 518. Another constraint for the myPort parameter 510 and the svrPort parameter 514 is imposed. This constraint may be that a port of the server should be equal to the port of the client/server part of the system.

In one example, a Server is a weather engine, and when passed a ZIP code, it returns current temperature. A Client-Server is acting as a front end to the Server, that is it takes a user input (ZIP), passes it to the Server, gets temperature from the Server and then passes temperature to the user. For this to work, the Server should be running on a known host identified by a hostname and on a specific port of that host identified by a port number. Also, the ClientServer should know the host and port of the Server, so it can communicate with the Server. Lastly, the user should know host and port of the ClientServer. The user prospective of a combination of the ClientServer and the Server constitutes a weather system and as such is having user accessible host and port. In order to implement the above system, the constraints that need to be satisfied in order for the weather system to deliver its functionality to users should be defined. The Server functionality is determined by values of its myHost and myPort parameters and the functionality of the ClientServer is determined by its srvHost, srvPort, aHost and aPort parameters. The Parameters srvHost and srvPort are for the ClientServer to know where the Server is. Parameters aHost and aPort are to be known to users in order to communicate with the ClientServer. Thus, srvHost should be equal to myHost and srvPort should be equal to myPort. Moreover, if both the Server and ClientServer components are to be running on the same device or box, srvHost and aHost should be the same. The weather system component has two parameters: host and port, values of which are equal to aHost and aPort correspondingly, because they are proxies for ClientSever component parameters.

Accordingly, a simple aggregate may be formed by multiple simplest aggregates whose parameters are bounded by constraints.

SCM and IM tasks are performed by invoking the functionality described in an aggregate description 206. Aggregate descriptions 206 may be specifications for functionalities such as provisioning, configuration, activation, deactivation, authorization, de-installation, and cloning for an executable 302 of an aggregate description 206. In one embodiment, aggregate description 206 may not provide the functionality for patching and upgrades because patching and upgrades may be external to aggregate description 206. For example, patching and upgrades may be introduced after an aggregate description 206 has been implemented.

Parameter constraints may be imposed on parameters for an aggregate description 206. The values of the constrained parameters may have to satisfy certain conditions to enable the aggregate description 206 to perform its functionality. For example, FIG. 6 discloses parameter constraints according to one embodiment of the present invention. As shown, a simplest aggregate A 502 and a simplest aggregate B 504 include the parameters as discussed in FIG. 5 according to one embodiment of the present invention.

Figure 6:
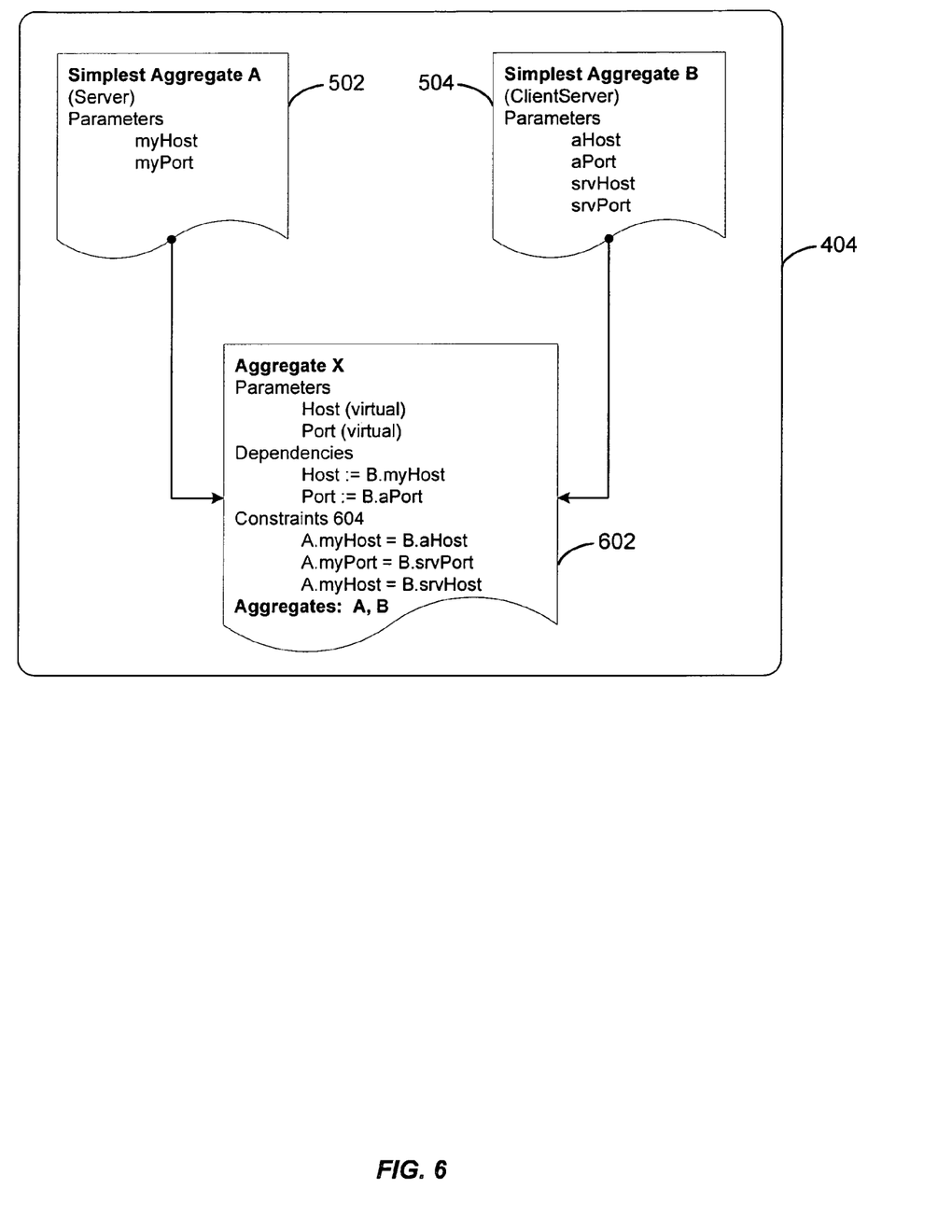
FIG. 6 discloses parameter constraints according to one embodiment of the present invention.

A simple aggregate 602 may be formed from simplest aggregate A 502 and simplest aggregate B 504. As shown, in a constraint summary 602, constraints 604 should be that host values should be equal (A.myHost=B.aHost). Additionally, port values should be equal (A.myPort=B.svrPort). Further, the host value should be equal to the host name of the system in which the component 106 in which aggregate 404 is installed (A.myHost=B.svrHost).

Using the above aggregates, the executables and parameters may be used to perform many SCM and IM tasks. Some tasks may be provisioning, patching, and purging. A provisioning task includes copying bits to a target system. The result of the provisioning is an aggregate, which is ready to be configured but cannot provide its functionality just yet. For instance, a piece of software is installed but cannot be started unless a valid serial number is supplied.

A patching aggregate includes changing bits on a target system. The patching may be applied to results of the provisioning as well as to ready to run or running aggregates. The patches provide patches to systems according to the executable parameters provided by an aggregate. The patches may be gentle or drastic. Gentle patches are patches that may be applied to running components 106 corresponding to aggregate descriptions 206. Drastic patches may be applied to components 106 that are not running. The result of a drastic patch is an aggregate with a component 106 that is ready to run.

A purging task may be removing bits from systems of which an aggregate description 206 was installed. Results of a purging are target systems without aggregate description 206 bits. An example of purging table is uninstalling a MS Windows application. This usually involves removing registry entries as well as erasing program(s) and libraries associated with said application from the hard drive. Those program(s) and libraries are referred here as "bits".

Other actions that may be performed include configuration, activation, deactivation, authorization, cloning, and upgrade tasks. A configuration task may include the initial configuration of a component 106 for an aggregate 206. The result of the configuration may be a component 106 that is ready to provide the functionality of an aggregate 206.

An activation task may be starting a component 106 corresponding to an aggregate 206. This may be applied to configured components 106. The result of the activation is a running component 106, which provides the functionality of an aggregate 206.

A deactivation task is stopping a running component 106 that was activated. The result of a deactivation is a non-running component 106 that corresponds to an aggregate 206.

An authorization task is a modification of configuration parameters for an aggregate 206. This may be applied to running components 106 or non-running components 106 corresponding to the aggregate 206.

An upgrade task is a modification of configuration parameters for an aggregate 206 that is combined with patching. This may be applied to components 106 that are running or non-running.

A cloning action is a copy of an aggregate to another component 106. It includes copying the bits and initial configuration for the aggregate 206. The result of the cloning is a new and configured component 106 that corresponds to the aggregate 206. The cloning may not alter the component 106 on which the aggregate was applied.

Accordingly, embodiments of the present invention provide many advantages. For example, a schema is provided that can be used to describe metadata for various components. Even if the components have different metadata for describing attributes, the schema can be used to describe the different metadata. Accordingly, the schema can be used to perform inventory control and configuration management tasks for different components that use different metadata. Thus, a uniform way of expressing metadata is provided.

Figure 7:
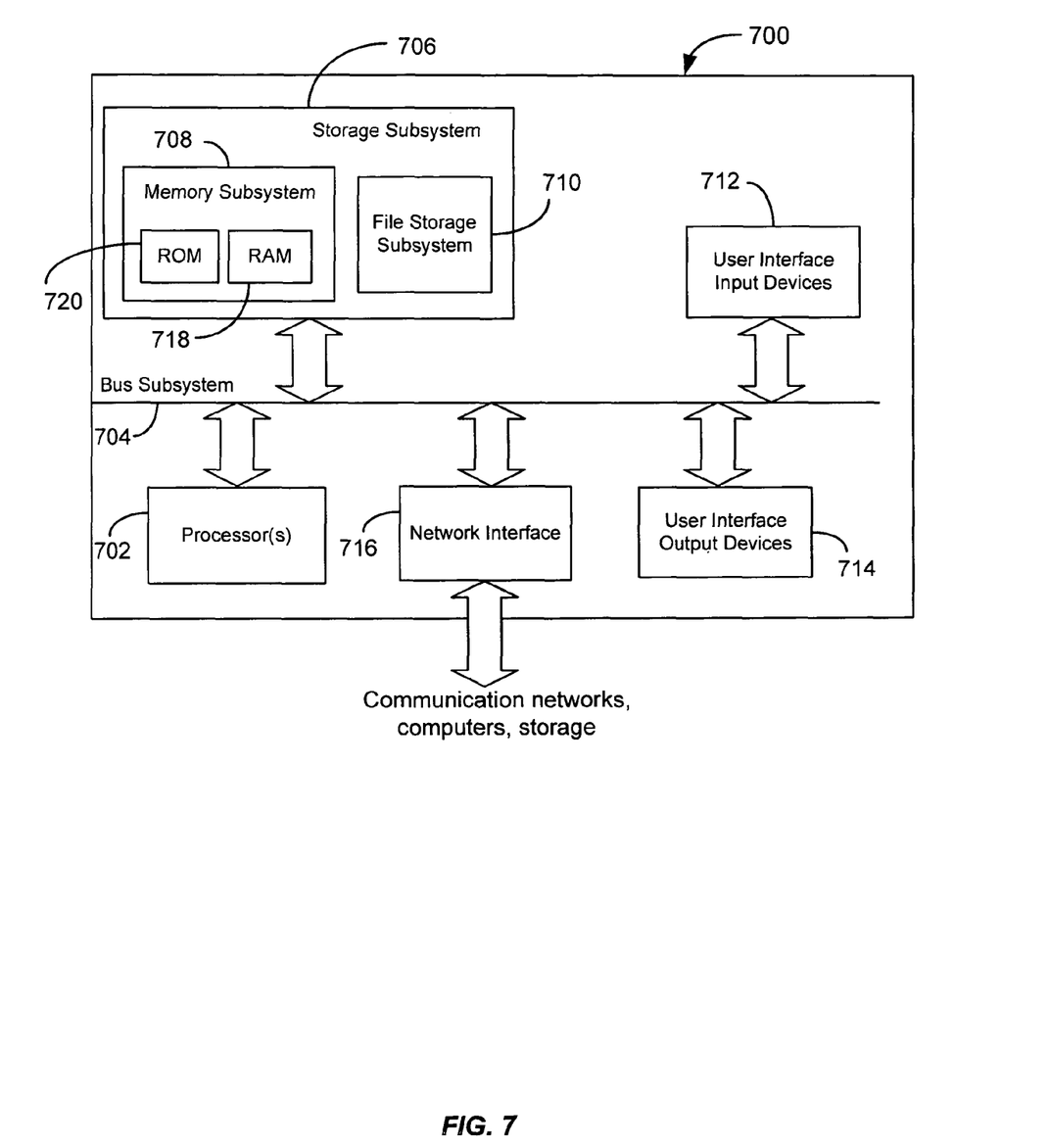
FIG. 7 is a simplified block diagram of a computer system according to an embodiment of the present invention.

FIG. 7 is a simplified block diagram of a computer system 700 according to an embodiment of the present invention. Embodiments of the present invention may be implemented using computer system 700. As shown in FIG. 7, computer system 700 includes at least one processor 702, which communicates with a number of peripheral devices via a bus subsystem 704. These peripheral devices may include a storage subsystem 706, comprising a memory subsystem 708 and a file storage subsystem 710, user interface input devices 712, user interface output devices 614, and a network interface subsystem 716. The input and output devices allow user interaction with computer system 700. A user may be a human user, a device, a process, another computer, or the like. Network interface subsystem 716 provides an interface to other computer systems and communication networks.

Bus subsystem 704 provides a mechanism for letting the various components and subsystems of computer system 700 communicate with each other as intended. The various subsystems and components of computer system 700 need not be at the same physical location but may be distributed at various locations within a network. Although bus subsystem 604 is shown schematically as a single bus, alternative embodiments of the bus subsystem may utilize multiple busses.

User interface input devices 712 may include a remote control, a keyboard, pointing devices, a mouse, trackball, touchpad, a graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 700.

User interface output devices 714 may include a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide non-visual display such as via audio output devices. In general, use of the term "output device" is intended to include all possible types of devices and ways to output information from computer system 600.

Storage subsystem 706 may be configured to store the basic programming and data constructs that provide the functionality of the computer system and of the present invention. For example, according to an embodiment of the present invention, software modules implementing the functionality of the present invention may be stored in storage subsystem 706. For example, modules implementing the functionality of ICCM 210 may be provided. These software modules may be executed by processor(s) 702. In a distributed environment, the software modules may be stored on a plurality of computer systems and executed by processors of the plurality of computer systems. Storage subsystem 706 may also provide a repository for storing various databases that may be used by the present invention. Storage subsystem 706 may comprise memory subsystem 708 and file storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media. One or more of the drives may be located at remote locations on other connected computers.

Computer system 700 itself can be of varying types including a personal computer, a portable computer, a workstation, a computer terminal, a network computer, a mainframe, a kiosk, a personal digital assistant (PDA), a communication device such as a cell phone, or any other data processing system. Server computers generally have more storage and processing capacity then client systems. Due to the ever-changing nature of computers and networks, the description of computer system 700 depicted in FIG. 7 is intended only as a specific example for purposes of illustrating the preferred embodiment of the computer system. Many other configurations of a computer system are possible having more or fewer components than the computer system depicted in FIG. 7.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description; but instead should be determined with reference to the pending claims along with their full scope or equivalents.

What is claimed is:

1. A computer-implemented method for inventory control and configuration management, the method comprising:
   receiving, at an information processing device configured to manage a plurality of software components where each software component has a non-uniform way of representing its metadata that configures the software component, a textual description of a simplest aggregate that configures a software component in the plurality of software components for execution, the simplest aggregate being an atomic entity aggregatable in another aggregate and identifying at least an executable and a set of parameters for the executable, the textual description of the simplest aggregate expressed according to a description schema modeling all activities handled by the information processing device that is different from the way the software component represents its metadata;
   receiving, at the information processing device, an instance schema for the simplest aggregate, the instance schema describing how to form instances of the simplest aggregate;
   generating, with a processor associated with the information processing device, an instance of the simplest aggregate based on the textual description of the simplest aggregate and the instance schema for the simplest aggregate;
   storing the instance in a memory associated with the first information processing device;
   determining, with the processor associated with the information processing device, one or more values for each parameter in the set of parameters;
   storing the one or more values for each parameter in the instance of the simplest aggregate; and
   configuring the software component with the processor associated with the information processing device based on the instance of the simplest aggregate and metadata for the software component that configures the software component.

2. The method of claim 1, wherein the instance of the simplest aggregate includes state information for the instance.

3. The method of claim 2, wherein the state information for the instance comprises values for parameters, results for the performed task, or a time stamp.

4. The method of claim 1, wherein the executable describes a functionality of the software component.

5. The method of claim 4, wherein the set of parameters are used to perform the functionality of the software component.

6. The method of claim 1, wherein the simplest aggregate forms part of the another aggregate in at least one of a simple aggregate, a complex aggregate, and a simple array aggregate.

7. The method of claim 1, wherein the textual description of the simplest aggregate comprises an Extensible Markup Language (XML) document.

8. An information storage medium having a plurality of instructions adapted to direct an information processing device to perform inventory control and configuration management, the information storage medium comprising:
   instructions for receiving a textual description of a simplest aggregate that configures for execution a software component in a plurality of software components managed by an inventory control and configuration management module, the simplest aggregate being an atomic entity aggregatable in another aggregate and identifying at least an executable and a set of parameters for the executable, the textual description of the simplest aggregate expressed according to a description schema modeling all activities handled by the information processing device that is different from the way the software component represents its metadata;
   instructions for receiving an instance schema for the simplest aggregate, the instance schema describing how to form instances of the simplest aggregate;

instructions for generating an instance of the simplest aggregate based on the textual description of the simplest aggregate;

instructions for determining one or more values for each parameter in the set of parameters and storing the one or more values for each parameter in the instance of the simplest aggregate; and instructions for configuring the software component based on the instance of the simplest aggregate and metadata for the software component that configures the software component.

9. The information storage medium of claim 8, wherein the instance of the simplest aggregate includes state information for the instance.

10. The information storage medium of claim 9, wherein the state information for the instance comprises values for parameters, results for the performed task, or a time stamp.

11. The information storage medium of claim 8, wherein the executable describes a functionality of the software component.

12. The information storage medium of claim 11, wherein the set of parameters are used to perform the functionality of the software component.

13. The information storage medium of claim 8, wherein the simplest aggregate forms part of the another aggregate in at least one of a simple aggregate, a complex aggregate, and a simple array aggregate.

14. The information storage medium of 8, wherein the textual description of the simplest aggregate comprises an Extensible Markup Language (XML) document.

15. A system configured to manage a plurality of software components where each software component has a non-uniform way of representing its metadata that configures the software component, the system comprising:

a processor; and a memory in communication with the processor and configured to store processor-executable instructions that configure the processor to:

receive a textual description of a simplest aggregate that configures a software component in the plurality of software components for execution, the simplest aggregate being an atomic entity aggregatable in another aggregate and identifying at least an executable and a set of parameters for the executable, the textual description of the simplest aggregate expressed according to a description schema modeling all activities handled by the information processing device that is different from the way the software component represents its metadata;

receive an instance schema for the simplest aggregate, the instance schema describing how to form instances of the simplest aggregate;

generate an instance of the simplest aggregate based on the textual description of the simplest aggregate and the instance schema for the simplest aggregate;

store the instance in the memory;

determine one or more values for each parameter in the set of parameters;

store the one or more values for each parameter in the instance of the simplest aggregate; and configure the software component based on the instance of the simplest aggregate and metadata for the software component that configures the software component.

16. The system of claim 15, wherein the instance of the simplest aggregate includes state information for the instance.

17. The system of claim 16, wherein the state information for the instance comprises values for parameters, results for the performed task, or a time stamp.

18. The system of claim 15, wherein the executable describes a functionality of the software component.

19. The system of claim 18, wherein the set of parameters are used to perform the functionality of the software component.

20. The system of claim 15, wherein the simplest aggregate forms part of the another aggregate in at least one of a simple aggregate, a complex aggregate, and a simple array aggregate.

21. The system of claim 15, wherein the textual description of the simplest aggregate comprises an Extensible Markup Language (XML) document.

* * * * *

UNITED STATES PATENT AND TRADEMARK OFFICE
CERTIFICATE OF CORRECTION

PATENT NO. : 8,010,576 B2
APPLICATION NO. : 11/121859
DATED : August 30, 2011
INVENTOR(S) : Nilva It is certified that error appears in the above-identified patent and that said Letters Patent is hereby corrected as shown below:

In column 1, line 7, after "from" delete "co-pending".

In column 6, line 67, delete "ClientSever" and insert -- ClientServer --, therefor.

Signed and Sealed this
Twenty-fourth Day of April, 2012

David J. Kappos
*Director of the United States Patent and Trademark Office*